Nov. 11, 1930.  C. F. REAGAN  1,781,341
SHOCK ABSORBER
Original Filed June 14, 1928
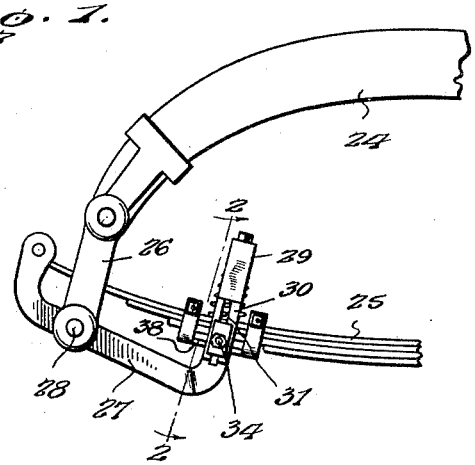
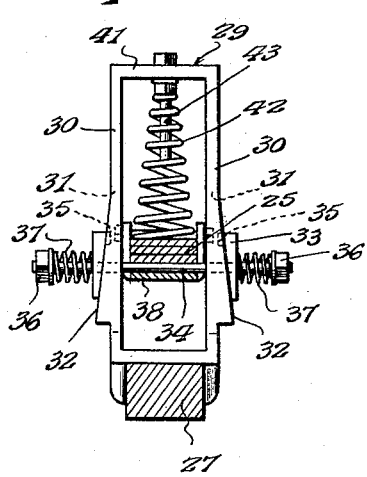 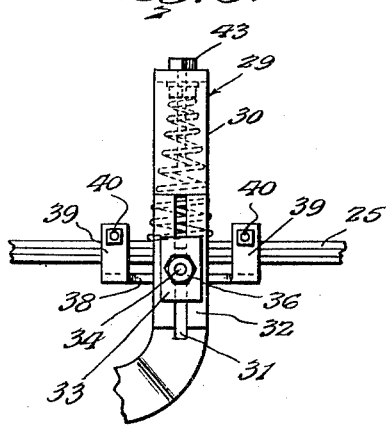
Inventor
C. F. Reagan
By Lacey & Lacey, Attorneys Patented Nov. 11, 1930

1,781,341

UNITED STATES PATENT OFFICE

CYRIL F. REAGAN, OF ALTOONA, PENNSYLVANIA

SHOCK ABSORBER

Original application filed June 14, 1928, Serial No. 285,492. Divided and this application filed June 11, 1929. Serial No. 370,118.

The present invention relates to improvements in shock absorbers and is a divisional application of my co-pending application Serial No. 285,492, filed June 14, 1928.

The primary object of the invention is to provide a shock absorber which can be easily and quickly applied to the vehicle in order that the shocks incident to the spring rebounding when encountering road obstructions, will be effectively absorbed.

Another object of the invention is to provide a device of this kind constructed in such manner that it can be placed upon the spring and connected with the vehicle side frame in a simple and practical manner.

Another object of the invention is to provide a device of this nature which is simple, in construction, efficient in operation, durable, and one which can be manufactured at a minimum cost.

With these and other objects in view, the invention resides in the novel features of construction, formation, combination and arrangement of parts to be hereinafter more fully described, claimed and illustrated in the accompanying drawing, wherein:

Figure 1 is a fragmentary side view of a vehicle side frame and spring showing the device in position thereon.

Figure 2 is a sectional view on the line 2—2 of Figure 1.

Figure 3 is an enlarged fragmentary side elevation.

Referring to the drawing, 24 designates a portion of a side frame of a vehicle, and 25 the usual leaf spring. To the forward end of the frame 24 is pivotally connected a clip 26 which is pivotally connected to the arm 27, the outer end of said arm being bent upwardly and pivoted, as at 28, to the terminal of the spring 25. The inner end of the arm is upturned and carries a loop 29. This loop has a side bar 30 formed with slots 31 and inclined faces 32 upon which slide the beveled plates 33. These plates are engaged with the bolt 34 which engages under the spring 25 and is movable in the slots 31, said plates having lugs 35 carried thereby and slidable in the slots to prevent swinging of said plates but, at the same time, permitting the same to slide freely.

The bolt 34 has engaged upon its ends nuts 36 and interposed between the nuts and plates 33 are coil springs 37 which serve to yieldably hold the plates engaged with the beveled faces 32.

In order to hold the bolt 34 engaged with the spring 25, a plate 38 is employed and is secured to the spring by ears 39, said ears having bolts 40 passed therethrough for engagement with the upper surface of the spring 25.

Interposed between the upper bar 41 of the loop 29 and the spring 25 is a coil spring 42, said spring being maintained in place by the bolt 43 carried by the bar 41.

Obviously, upward movement of the arm 27 which carries the loop 29 will be retarded owing to the fact that the plates 33 will remain stationary as the beveled faces 32 slide thereon.

From the foregoing, it is thought that the construction, operation, and many advantages of the herein described invention will be apparent to those skilled in the art, without further description, and it will be understood that various changes in the size, shape and proportion and minor details of construction may be resorted to without departing from the spirit or sacrificing any of the advantages of the invention.

What is claimed is:

1. The combination with the side frame and spring of a vehicle, of an arm pivotally connected with the spring, means pivotally connecting the arm intermediate its ends with the frame, a loop carried by the free end of the arm and confining the spring, said loop having beveled faces upon its sides, plates slidably engaged with said faces, a bolt connecting the plates, and means securing the bolt to the plates.

2. The combination with the side frame and spring of a vehicle, of an arm pivotally connected with the spring and side frame, a loop carried by the free end of the arm confining the spring, said loop having slots in its side bars, a bolt slidable in the slots, plates slidable with the bolt, said bars having beveled faces for engaging the plates, means carried by the bolt yieldably holding the plates engaged with said faces, a spring confined within the loop and bearing upon the vehicle spring, and means for clamping the bolt to said vehicle spring.

In testimony whereof I affix my signature.

CYRIL F. REAGAN. [L. S.]